(12) United States Patent
Harris et al.

(10) Patent No.: US 8,314,961 B1
(45) Date of Patent: Nov. 20, 2012

(54) METHOD AND APPARATUS FOR PRINTING RASTER PAGE

(75) Inventors: David H. Harris, Eagle, ID (US); Randall D. Briggs, Boise, ID (US)

(73) Assignee: Marvell International Ltd., Hamilton (BM)

(*) Notice: Subject to any disclaimer, the term of this patent is extended or adjusted under 35 U.S.C. 154(b) by 1345 days.

(21) Appl. No.: 12/015,132

(22) Filed: Jan. 16, 2008

Related U.S. Application Data (60) Provisional application No. 60/885,541, filed on Jan. 18, 2007.

(51) Int. Cl.
*G06F 3/12* (2006.01)
*G06K 15/00* (2006.01)

(52) U.S. Cl. ............... 358/1.15; 358/1.13; 358/1.14; 358/1.16; 358/1.17

(58) Field of Classification Search .......... 358/1.2, 358/3.21–3.24, 1.13–1.16, 405–407, 409, 358/412, 425–434
See application file for complete search history.

(56) References Cited

U.S. PATENT DOCUMENTS

| | | | |
|---|---|---|---|
| 5,129,049 A * | 7/1992 | Cuzzo et al. ............... 358/1.14 |
| 5,479,587 A * | 12/1995 | Campbell et al. ............ 358/1.17 |
| 6,337,747 B1 * | 1/2002 | Rosenthal .................... 358/1.15 |
| 6,583,887 B1 * | 6/2003 | Clouthier et al. ............ 358/1.15 |
| 6,778,291 B1 * | 8/2004 | Clouthier .................... 358/1.16 |
| 6,891,632 B2 * | 5/2005 | Schwartz .................... 358/1.15 |
| 8,040,537 B2 * | 10/2011 | Smith .......................... 358/1.13 |
| 2006/0072164 A1 * | 4/2006 | Kato et al. .............. 358/426.07 |
| 2007/0076966 A1 * | 4/2007 | Lee .............................. 382/239 |

* cited by examiner

*Primary Examiner* — Twyler Haskins
*Assistant Examiner* — Jonathan Beckley (57) ABSTRACT

Aspects of the disclosure provide a method and an apparatus that can ensure transferring a page over a communication link having a transfer rate to satisfy a print rate by reducing a data size of the page. The method for printing a page can include allocating a transfer rate to a printer having a print rate, generating a first printable raster page at a first print quality, determining whether the first printable raster page can be transferred to the printer at the transfer rate and satisfy the print rate of the printer, generating a second printable raster page at a second print quality that is lower than the first print quality, when the first printable raster page can not be transferred to the printer at the transfer rate and satisfy the print rate of the printer, and transferring the second printable raster page to the printer.

25 Claims, 6 Drawing Sheets

METHOD AND APPARATUS FOR PRINTING RASTER PAGE

INCORPORATION BY REFERENCE

This application claims the benefit of U.S. Provisional Application No. 60/885,541, "METHOD FOR PRINTING LARGE RASTER PAGES IN A RACE-THE-LASER PARADIGM" filed on Jan. 18, 2007, which is incorporated herein by reference in its entirety.

BACKGROUND

A host-based printing system can include a host computer, a printer and a communication link that couples the host computer and the printer. The printer can receive rasterized page data from the host computer via the communication link, and print a page according to the page data received. Generally, a laser printer can be required to print the page in a continuous manner. In other words, once the laser printer starts moving a piece of paper through a printing mechanism, it may not be allowed to pause. Meanwhile, a laser beam can scan a photoreceptor surface line-by-line, turning on and off to control pixel formation according to the page data. Therefore, in order to print a pixel properly, the pixel data must be available to the printer at the time when the pixel is about to be formed on the photoreceptor. Otherwise, printing may fail.

Various techniques can be utilized to ensure successful printing. For example, the printer can include a high capacity memory unit. The memory unit may store the entire page data before printing starts, so that page printing can safely begin, as there are no concerns whether pixel data will be available to the printer in time. However, the high capacity memory unit may increase the printer cost. In another technique, the printer can print while the host computer is sending the page data through the communication link. However, the communication link may not have enough transfer rate to ensure pixel data will be available to the printer in time.

SUMMARY

Aspects of the disclosure can provide a method that can ensure page transfer over a communication link having a transfer rate to satisfy a print rate. The method can reduce a page data size by means of reducing a page print quality. The method for printing a page can include allocating a transfer rate through a communication link to a printer having a print rate, generating a first printable raster page at a first print quality, determining whether the first printable raster page can be transferred to the printer at the transfer rate and satisfy the print rate of the printer, generating a second printable raster page at a second print quality that is lower than the first print quality, when the first printable raster page can not be transferred to the printer at the transfer rate and satisfy the print rate of the printer, and transferring the second printable raster page to the printer. According to the disclosure, the reduced print quality can be realized by utilizing at least one of a compression algorithm and a lower print resolution.

Additionally, to generate the first printable raster page at the first print quality, the method can generate the first printable raster page with a first print resolution. Further, to generate the second printable raster page at the second print quality, the method can generate the second printable raster page with a second print resolution that is lower than the first print resolution.

Alternatively, to generate the first printable raster page at the first print quality, the method can generate a first raster page with a first print resolution, and compress the first raster page with a first compression algorithm. According to an aspect of the disclosure, the first compression algorithm can be a lossless compression algorithm. Further, to generate the second printable raster page at the second print quality, the method can compress the raster page with a second compression algorithm that results in lower print quality. According to an aspect of the disclosure, the second compression algorithm can be a lossy compression algorithm. In addition, when none of the compression ratios can make the printable raster page able to be transferred to the printer at the transfer rate and satisfy the print rate of the printer, the method can generate the second raster page with a second resolution, and compress the second raster page with a first compression algorithm.

According to aspects of the disclosure, the method can compare a data size of the printable raster page with a size criterion associated with the print rate and the transfer rate of the communication link, to determine whether the printable raster page can be transferred to the printer fast enough to satisfy the print rate of the printer,. Alternatively, the method can compare print rate and a page transfer rate that is associated with data size of the printable raster page and the communication link transfer rate. Further, the method can compare the compression ratio of the printable raster page data with a compression ratio criterion that is associated with the print resolution, the communication link transfer rate and the print rate.

Aspects of the disclosure can also provide an apparatus for printing a page at a specific print rate. The apparatus can include an interface unit having a transfer rate and the interface unit being coupled to a printer, and a controller that is configured to generate a first printable raster page at a first print quality, determine whether the first printable raster page can be transferred to the printer at the transfer rate and satisfy the print rate of the printer, generate a second printable raster page at a second print quality that is lower than the first print quality when the first printable raster page can not be transferred to the printer at the transfer rate and satisfy the print rate of the printer, and transfer the second printable raster page to the printer.

In addition, aspects of the disclosure can provide a printing system for printing a page. The printing system can include a printer that is configured to print the page at a print rate, an interface unit having a transfer rate and the interface unit being coupled to a printer, and a controller that is configured to generate a first printable raster page at a first print quality, determine whether the first printable raster page can be transferred to the printer at the transfer rate and satisfy the print rate of the printer, generate a second printable raster page at a second print quality that is lower than the first print quality if not, and transfer the second printable raster page to the printer.

BRIEF DESCRIPTION OF THE DRAWINGS

Various exemplary embodiments of this disclosure will be described in detail with reference to the following figures, wherein like numerals reference like elements and wherein.

DETAILED DESCRIPTION OF EMBODIMENTS

Figure 1:
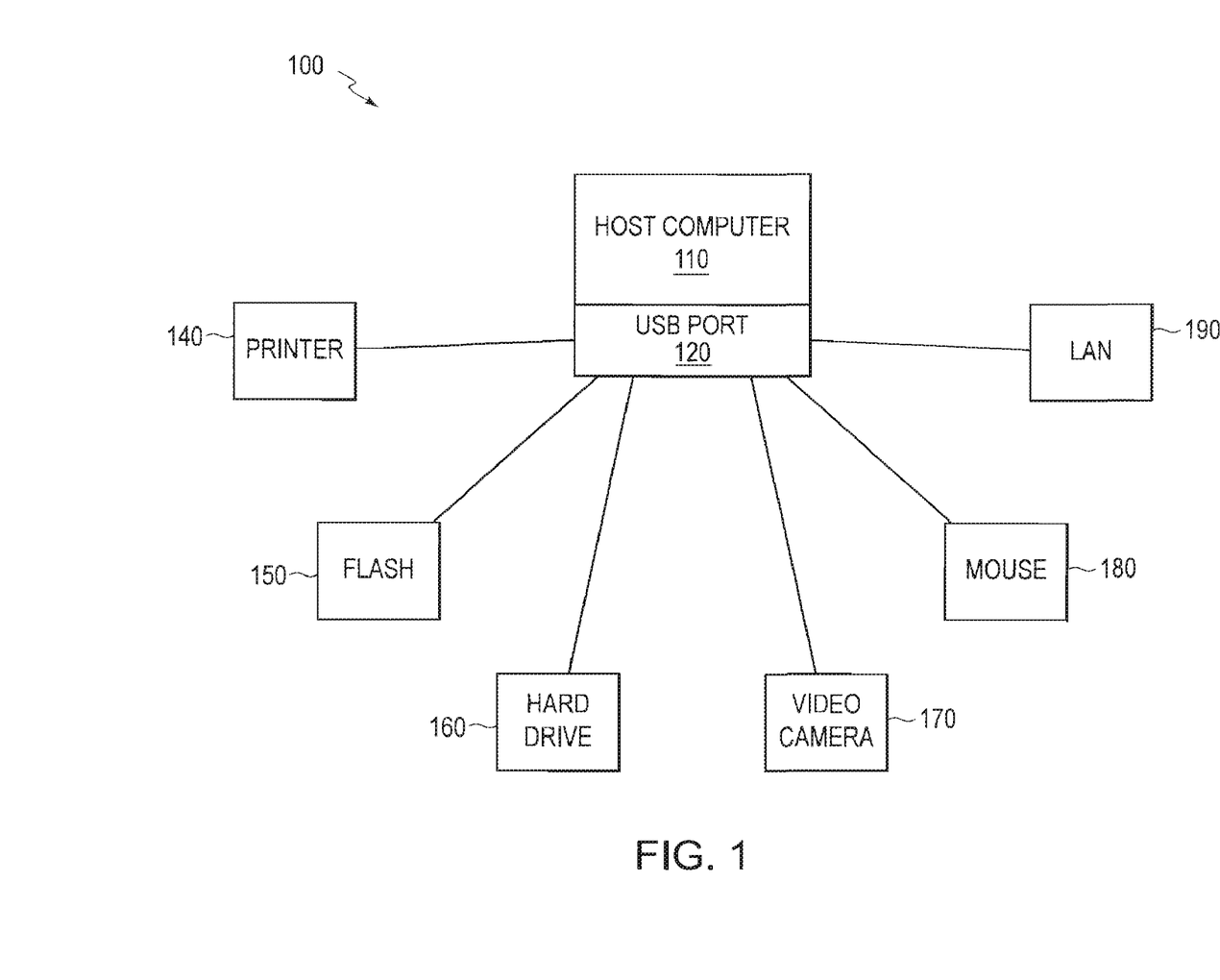
FIG. 1 shows an exemplary scenario of a host computer connecting various peripheral devices.

Generally, a host computer can include a port, such as Universal Serial Bus (USB), Ethernet, and IEEE 1394, through which the host computer can transfer data to various peripheral devices. FIG. 1 shows an exemplary scenario of a computer system 100 that can include a host computer 110 that is coupled to various peripheral devices 140-190 via a USB port 120. The USB port 120 can be expanded and can couple the host computer 110 with more than 100 peripheral devices. As shown in FIG. 1, the USB port 120 can couple the host computer 110 with a flash drive 150, an external hard drive 160, a video camera 170, a mouse 180, a LAN 190 and a printer 140. The host computer 110 can control the printer 140 to print a page according to the disclosure.

When a port, such as the USB port 120 in FIG. 1, is shared by various peripheral devices, the port may have to meet different data transfer requirements of the various peripheral devices. For example, some peripheral devices, such as the mouse 180, may require instantaneous and accurate communication, but data size can be small. Some peripheral devices, such as the external hard drive 160, may need to send to or receive from the host computer 110 large amounts of data accurately, but without critical timing requirement. Still some peripheral devices, such as the video camera 170, may require guaranteed data delivery in real time.

The USB port 120 can use different types of data flow, such as interrupt transfer, bulk transfer and isochronous transfer data flows, to meet the communication requirements of the various peripheral devices. Interrupt transfer data flow can provide timely and reliable delivery of moderate quantities of data. Therefore, interrupt transfer data flow can be used by peripheral devices, such as mouse 180, that require instantaneous and accurate communication with the host computer 110. Bulk transfer data flow can transfer large quantities of data in a relatively long time duration. Therefore, bulk transfer data flow can be used by peripheral devices, such as the external hard drive 160, that need to transfer between the host computer 110 large amounts of data accurately without critical timing requirement. Isochronous transfer data flow can transfer data with guaranteed delivery, but are unable to ensure error free delivery. Therefore, isochronous transfer data flow can be used by peripheral devices, such as video camera 170, that require guaranteed data delivery in real time, but can tolerate errors in the data.

A printer generally cannot tolerate data errors. The printable raster page data itself may actually tolerate some data errors since this may only corrupt a few pixels and not be visible to a user. However, control structures and protocols that support the printable raster page data transfer from a host computer to the printer may not be error tolerant. Furthermore, the printable raster page data is generally compressed and the compressed data is very sensitive to errors. A single error in the compressed data may fail to decompress or result in large number of errors after decompression. For this reason, the bulk or interrupt data flows are often utilized in transferring data to the printer, while the isochronous data flow is not. For example, a printer having a large memory that is able to store page data in the memory may utilize the bulk transfer data flow, so that large amounts of page data can be transferred and stored in the printer before printing starts. On the other hand, another printer, for example the printer 140 according to the disclosure, may not have a large memory. The printer 140 can start printing when it receives a beginning portion of a page. A remainder portion of the page can be sent to the printer 140 while an earlier portion is under printing by the printer 140. As described previously, the printer 140 can print the page in a continuous manner, such as at a particular print rate. In order to print the page successfully, data for a portion of the page needs to be transferred at a particular transfer rate to the printer before the printer 140 prints on the portion of the page. The printer 140 may need to require guaranteed data delivery in real time to ensure successful printing. Therefore, the interrupt transfer data flow can be appropriate for printer 140.

Generally, a peripheral device can acquire an appropriate data flow by using an enumeration process. For example, the USB type peripheral devices can work in a plug-and-play style, therefore, the data flow type and associated parameters can be requested when a peripheral device is plugged in. For example, when a peripheral device is physically connected to the host computer 110 via the USB port 120, the presence of the connected peripheral device can be detected by the host computer 110, and then the enumeration process can begin.

In the enumeration process, the host computer 110 can assign a unique USB address to the connected peripheral device, query the connected peripheral device about its requirements and capabilities. The peripheral device may load its pre-stored configuration information to the host computer 110, and negotiate with the host computer 110 for a share of USB resources with the host computer 110. For example, a descriptor, which can state the peripheral device's USB bandwidth requirement, can be loaded into the host computer 110. According to the requirement of the peripheral device, and the present resource allotment, the host computer 110 may grant the peripheral device access to its USB, write data about the connected peripheral device into its operating system, and load the appropriate software device driver from a storage location into its operating system. Upon completion of the enumeration process, the connected peripheral device can be recognized by the host computer 110, and can use the assigned resource of the host computer 110.

However, if the requirement of the peripheral device can not be satisfied based on the present resource allotment of the host computer 110, the logical connection may be rejected, even though the peripheral device is physically connected to the host computer 110. For example, a high resolution printer 140 having a high print rate may need a large data transfer rate to feed the printing mechanism, therefore, the printer 140 may request a large communication bandwidth. While the host computer 110 connects with various peripheral devices that already occupy large portion of the communication capacity, the transfer rate requirement of the printer 140 can not be satisfied. The connection of the printer 140 may be rejected.

To avoid rejection, the printer 140 may provide several data transfer rate selections ranging from high to low for the host computer 110 to choose from. Then the host computer 110 may choose an appropriate transfer rate that suits its present communication bandwidth allotment, and allocate the transfer rate to the printer 140. The allocated transfer rate may be smaller than the required transfer rate that can fully utilize the printing capability of the printer 140 to print a page. According to the disclosure, print quality of the page may be lowered to compensate for the reduced data transfer rate.

Once an interrupt type data transfer rate is allocated to the printer 140, the printer 140 can be considered as being connected to the host computer 110 via a distinct communication link having the allocated data transfer rate. The communication link can have the guaranteed data transfer rate regardless of other peripheral devices. The host computer 110 coupled with the printer 140 via such a communication link can be considered as a host-based printing system.

According to the disclosure, a host-based printing system can include a printer and a controller that are coupled together via a communication link. The controller can be configured to generate a printable raster page, and determine whether the printable raster page can be printed by the printing system considering the print system constraints, such as communication link transfer rate and print rate. Transfer rate can be the interrupt type data transfer rate assigned to the communication link, for example 1.5 Mbytes per second. Print rate, a rate at which the printer prints a raster page, for example, 0.5 page per second (30 ppm) means the printer can print one page in two seconds. Once it is determined that the printable raster page can be successfully printed by the host-based print system, the controller can transfer the printable raster page to the printer for printing. Otherwise, the controller may lower the print quality to generate another printable raster page.

Figure 2:
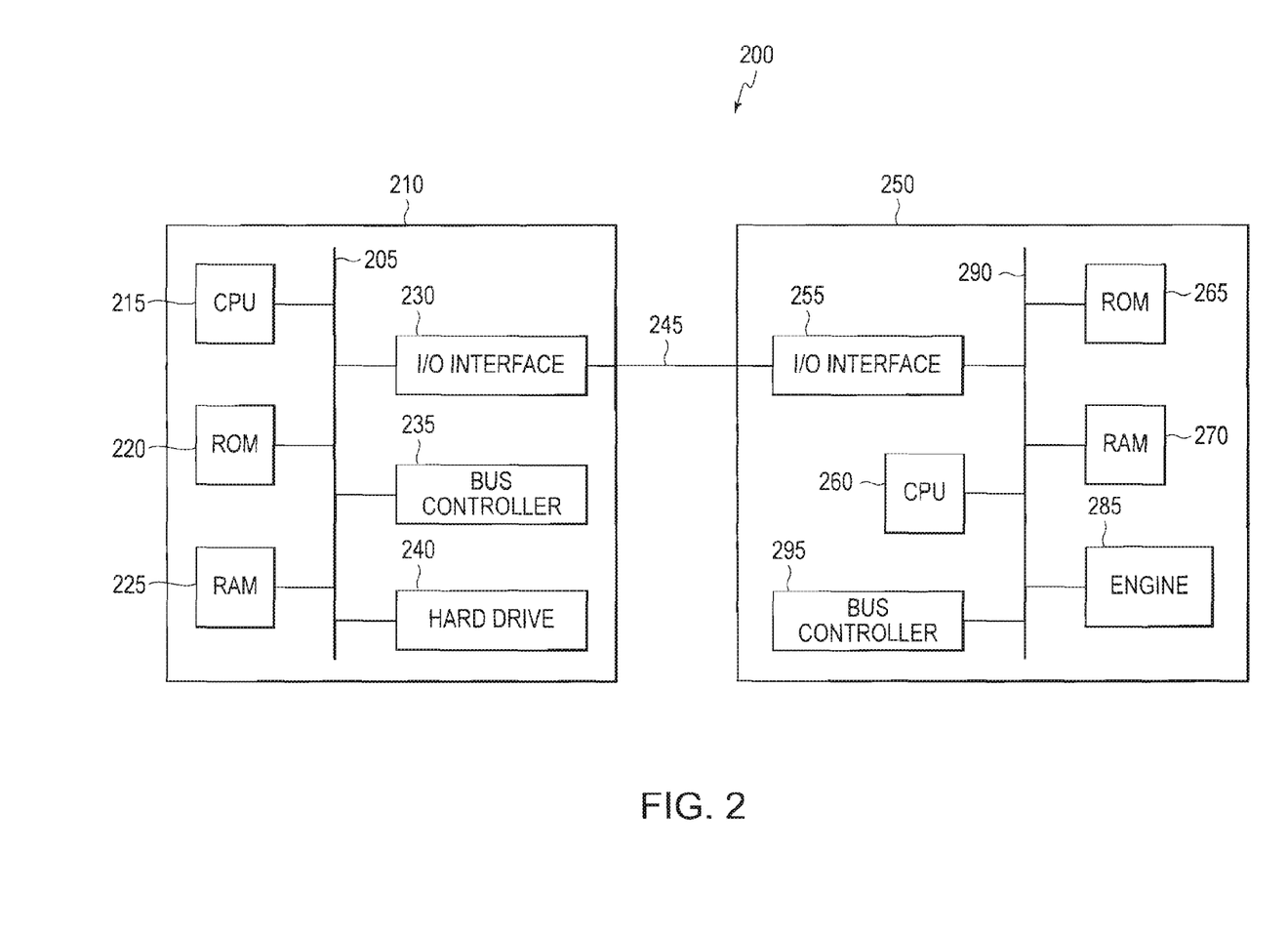
FIG. 2 shows an exemplary host-based printing system including a host computer and a printer.

FIG. 2 shows an exemplary host based printing system 200 including a controller in the form of a host computer 210 and a printer 250 coupled by communication link 245. The host computer 210 can include various components, such as a CPU 215, a ROM unit 220, a RAM unit 225, an I/O interface 230, and a hard drive 240. The CPU 215 can execute system and application codes, more specifically execute data operations according to commands. The ROM unit 220 is read-only and can pre-store system and application codes that generally do not change. The RAM unit 225 is writeable and readable, and can be accessed at a fast speed. The RAM unit 225 can be configured to store application codes and data that can be executed or generated by the CPU 215 during operation. The hard drive 240 can have a large storage capability, and store a large number of applications and a large amount of data. The I/O interface 230 can connect the computer 210 with peripheral devices, for example, the print 250, and can be configured to communicate with the connected peripheral devices.

In addition, as shown in FIG. 2, a bus 205 can be used to couple the components of the host computer 210, and a bus controller 235 can be configured to enable the components of the host computer 210 to work together via the bus 205. For example, the bus controller 235 may enable the bus 205 to transfer printer configuration data from the I/O interface 230 to the RAM unit 225 for storing, and the bus controller 235 may enable the bus 205 to transfer application codes from the RAM unit 225 to the CPU 215 for execution.

The host computer 210 may have large computation and storage capability due to technology improvements of the computer industry. For example, the CPU 215 can be configured as a multiple-core processor, so that it can do complex computations faster than a single-core processor. The RAM 225 and the hard drive 240 can have large storage capability and increased data transfer speed. In addition, the controller 235 and the bus 205 can be configured to enable efficient and fast data transfer within the host computer 210.

As further shown in FIG. 2, the printer 250 can include various components, such as a CPU 260, a ROM unit 265, a RAM unit 270, a print engine 285 and an I/O interface 255, that can enable the printer 250 to print a page. The CPU 260 can execute data operations. The ROM unit 265 is read-only and can pre-store printer system codes that generally do not change. The RAM unit 270 is writeable and readable, and generally has faster reading and writing speed. The RAM unit 270 can be configured to buffer page data for printing. The I/O interface 255 can communicate with the host computer 210, more specifically can send configuration data to the host computer 210, and can receive page data from the host computer 210. The engine 285 can print a page according to the page data buffered in the RAM unit 270.

In addition, as shown in FIG. 2, a bus 290 can be used to couple the components of the printer 250, and a bus controller 295 can be configured to enable the components of printer 250 to work together via the bus 290. For example, the bus controller 295 may enable the bus 290 to transfer data received by the I/O interface 255 to the RAM unit 270 for buffering. Further, the bus controller 295 may enable the bus 290 to transfer data from the RAM unit 270 to the CPU 260 for processing and back to RAM unit 270. Subsequently, the bus controller 295 may enable the bus 290 to transfer data from the RAM unit 270 to the engine 285 for printing.

The printer 250 can be a high resolution and low cost printer, which may be preferred by the printer market. To lower the cost, the printer 250 can use low cost CPU 260 and low cost RAM 270. The low cost CPU 260 may have limited computation capability, and the low cost RAM 270 may have limited storage capability. Therefore, the printing system 200 may rely on the computation and storage capability of the host computer 210 to perform a printing job.

As described above, the communication link 245 that is responsible for the communication between the host computer 210 and the printer 250 may have a limited data transfer rate that can not ensure successful printing of every page. For example, the printer 250 having a resolution of 1200 dots-per-inch (dpi) can print an 8.5"×11" page in 2 seconds. The host computer 250 can generate a raster page having a resolution of 1200 dpi. The raster page may have over 16 Mbytes data size assuming one bit per pixel. For communication link 245 having a transfer rate of 2 Mbytes per second, the raster page may require over 8 seconds to transfer, which is much longer than the printing time for the page, and may result in a printing failure without shrinking the page data size.

Compression techniques can be used to shrink the page data size. However, the compression ratio, which is a ratio of data size before and after compression, can vary from one page to another due to the content of the page. Some pages that have large compression ratios (small page data size after compression) can be transferred and printed successfully, while other pages that may be difficult to compress can not be transferred fast enough to satisfy the print rate. More specifically, for a page of large data size, transferring the raster page data over the communication link 245 may take longer than the time to print the page through the print engine 285. In such a case, the page may not be printed successfully. The disclosure can provide a method to detect those pages, and can adjust print quality to ensure successful transfer and printing of those pages.

Figure 3:
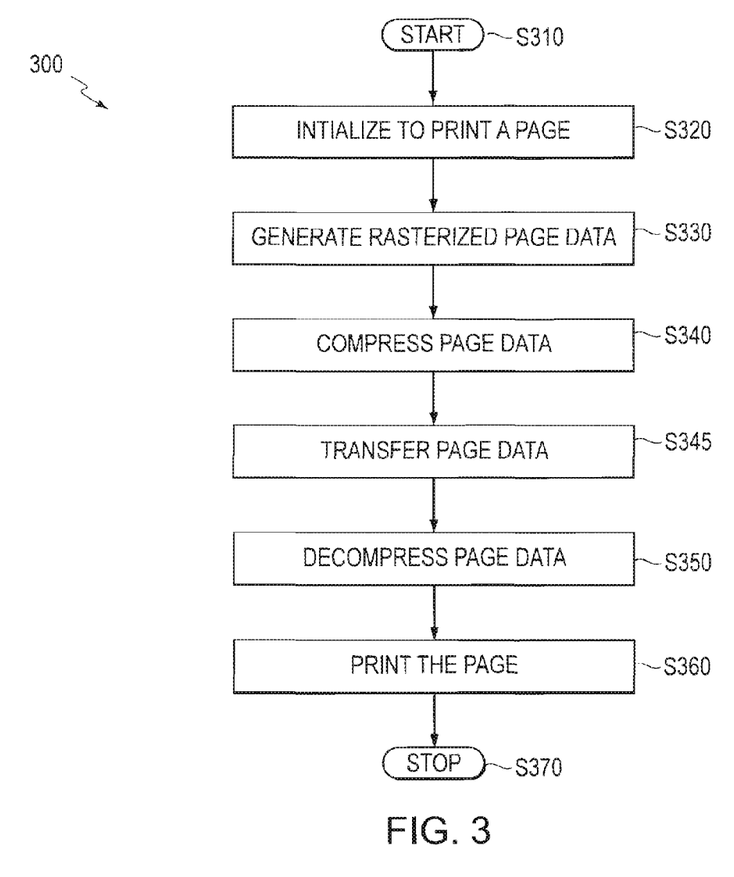
FIG. 3 shows a flow chart outlining an exemplary process for the host-based printing system to print a page.

FIG. 3 shows a flow chart outlining an exemplary process for the host-based printing system 200 to print a page. The process starts at step S310, and proceeds to step S320, where an application that is running on the host computer 210 can initialize a printing job to print a page. The page may include texts and/or images, which are in their respective formats.

Then, the process proceeds to step S330, where the printing system 200 can generate a raster page having an appropriate page resolution. The appropriate page resolution can be determined according to the disclosure. The raster page can have large data size, and can be stored within the host computer RAM unit 225.

After generating the raster page, the exemplary printing process proceeds to step S340, where the host computer 210 can compress the raster page according to a compression algorithm. The compression algorithm can be lossless or lossy. Generally, the lossless compression algorithm can have lower compression ratio than the lossy compression algorithm. Therefore, the lossless compressed page can have larger data size than the lossy compressed page. On the other hand, the lossless compression may have higher print quality than the lossy compression. The lossless compressed page can be recovered without loss of information, while the lossy compressed page can be recovered with loss of information, therefore print quality of the page can be lower for the lossy compression algorithm. The host computer 210 can determine a compression algorithm according to the disclosure, and compress the raster page.

Subsequently, the process proceeds to step S345, where the compressed raster page can be transferred to the printer 250 by the communication link 245. The communication link 245 can have a guaranteed data transfer rate.

The process then proceeds to step S350, where the printer 250 can decompress the compressed raster page. As describe above, the lossless compressed page can be fully recovered, while the lossy compressed page can be recovered with loss, which can affect the print quality.

The process then proceeds to step S360, where the decompressed page data can be fed to the print engine 285 to print the page. Finally, the process proceeds to step S370, and terminates.

As can be seen, to ensure successful printing, various factors need to be taken into consideration, such as the printer 250 resolution, the printer page print rate, compression algorithm, page characteristics, and the communication link 245 transfer rate.

Figure 6:
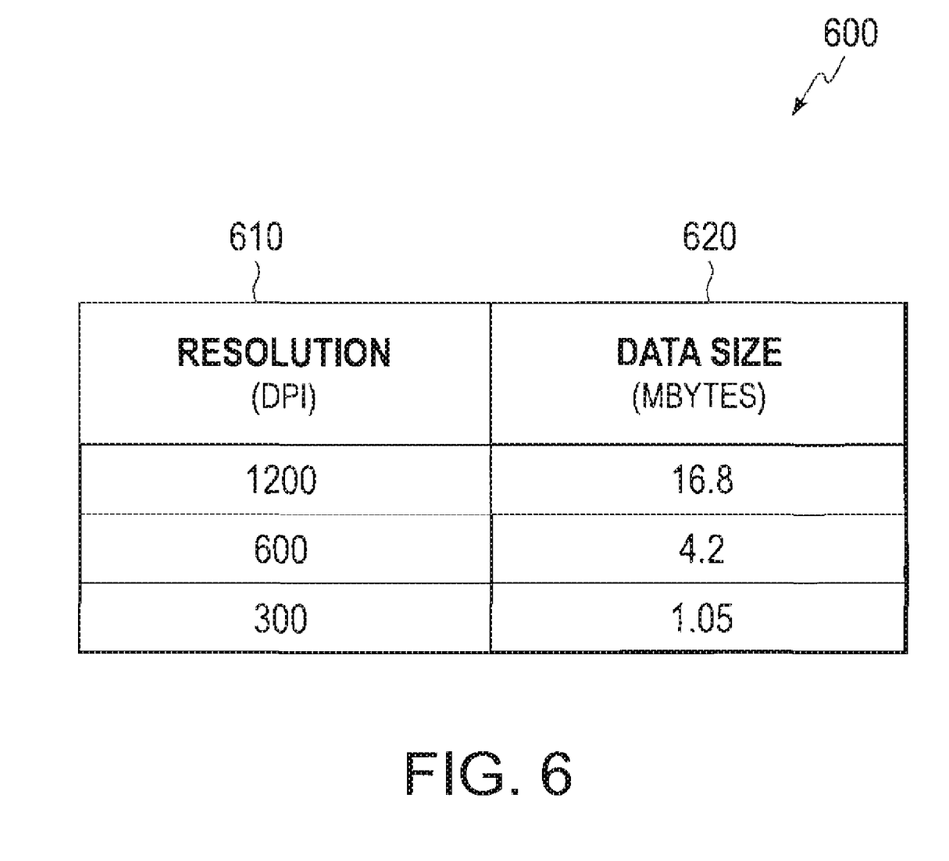
FIG. 6 shows an exemplary relationship of page print resolution and raster page data size.

As described earlier, at the time of connection, the host computer 210 can record printer configuration data including storage capacity and the printer resolution. The printer resolution can indicate the printer capability, and can limit the resolution of the rasterized page data generated on host computer 210. Generally, high resolution is desired. However, high resolution can mean large data size, and may result in printing failure. FIG. 6 shows a table illustrating an exemplary relationship of resolution and data size for an uncompressed raster page, assuming the page size is 8.5"×11", and one bit per pixel. As can be seen, the data size for the rasterized page with resolution 300 dpi is 1/16 of resolution 1200 dpi, and can be transferred by the communication link 245 having transfer rate of 2 Mbytes per second in less than one second without compression. Therefore, low resolution can have higher chance of successful printing for a printer that begins printing before the entire raster page has been received.

For compression algorithms, lossless algorithm can have smaller compression ratio, while lossy algorithm can have larger compression ratio. In addition, some pages can be easy to compress and have a large compression ratio, and some pages can be difficult to compress and have a small compression ratio.

Moreover, the transfer rate of communication link 245 can affect printing. When a larger transfer rate is allocated to the communication link 245, pages with larger data size, such as higher resolution or lower compression ratio, can be transferred and printed successfully. When a lower transfer rate is allocated to the communication link 245, pages with larger data size may need to lower the print quality to reduce the data size to ensure successful printing.

Figure 5:
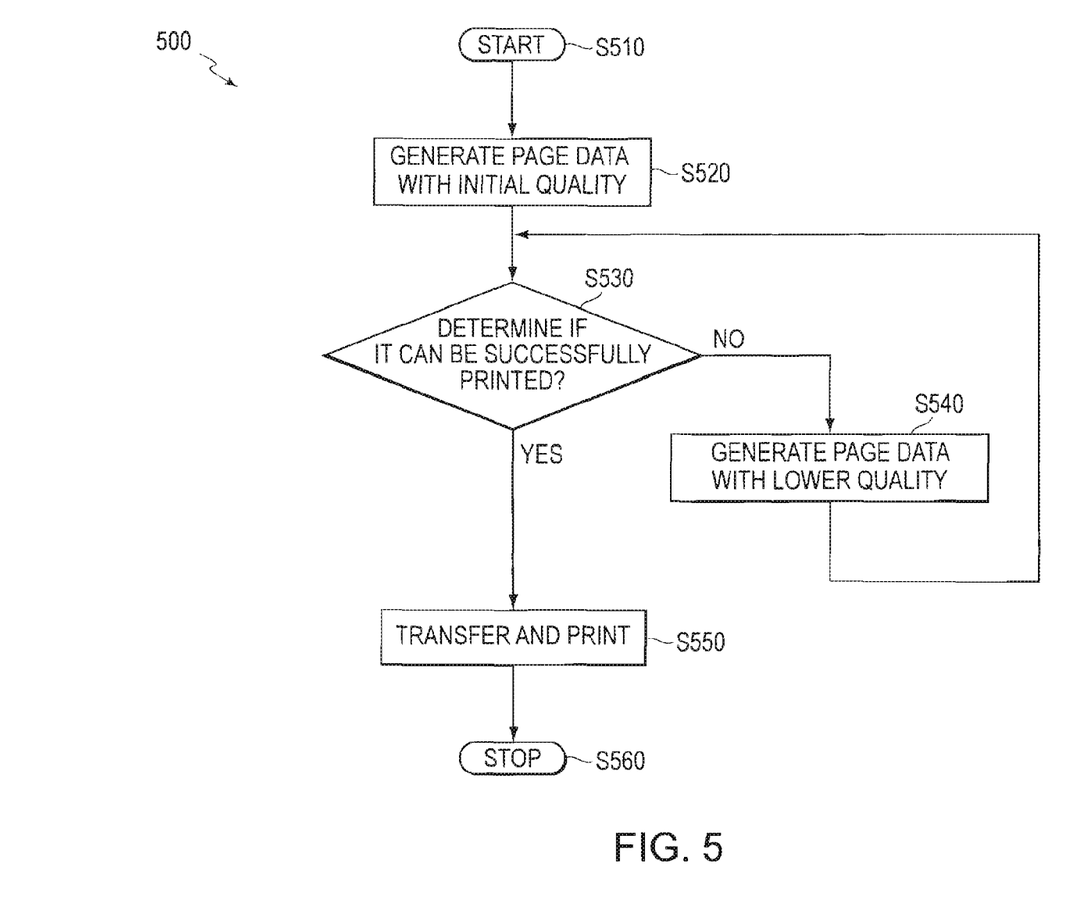
FIG. 5 shows a flow chart outlining an exemplary process for a host-based printing system to print a page.

FIG. 5 shows a flow chart outlining an exemplary process for the host-based printing system 200 to print a page according to the disclosure. The process starts at step S510, and proceeds to step S520, where the host computer 210 can generate a printable raster page with a first print quality. For example, the host computer 210 can generate a raster page with the highest printer resolution, and compress the raster page using a lossless compression algorithm. The compressed raster page can be printable, but may not be successfully printed by the printing system 200 considering the transfer rate of the communication link 245 and the print rate of the printer 250.

Then the process proceeds to step S530, where a determination can be made as to whether the printable raster page can be successfully printed, more specifically whether the printable raster page can be transferred to the printer 250 at a transfer rate sufficiently large to satisfy the print rate of the printer 250. In an embodiment, a criteria table based on the print rate of the printer 250 can be loaded into the host computer 210, and the evaluation can be based on the criteria table.

Figure 4:
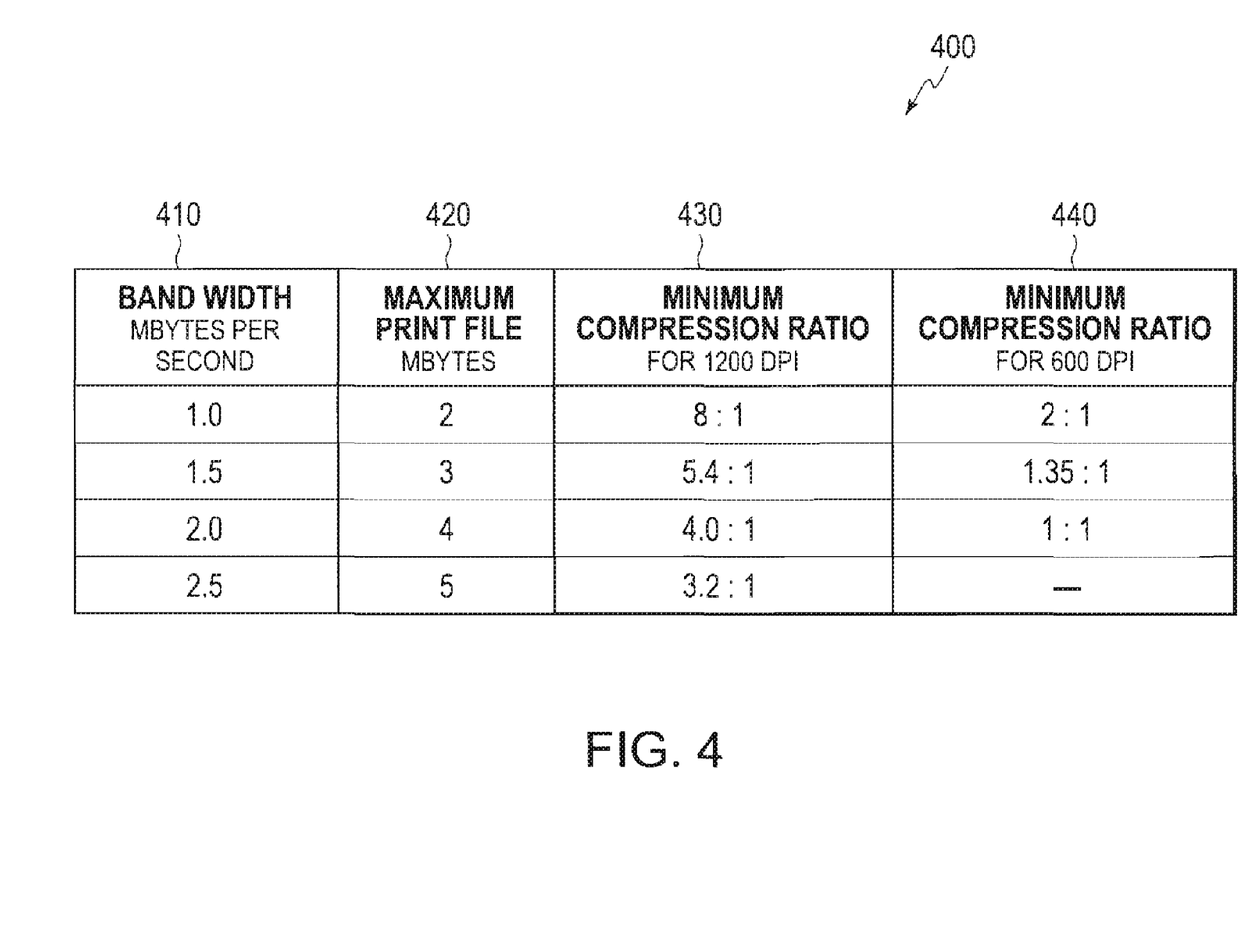
FIG. 4 shows an exemplary data structure used for making decisions for successful printing.

FIG. 4 shows such an exemplary criteria table 400. The criteria table is based on a printer having a print rate of 0.5 page per second (30 ppm). The criteria table 400 can include field 410 for transfer rate that can be assigned to the communication link 245; field 420 for maximum file size that can be transferable by the communication link 245 during printing, which can be used to evaluate data size of the printable raster page; field 430 and field 440 for minimum compression ratio with different page resolutions, which can be used to evaluate compression ratio. In addition, the print rate can be used to evaluate page transfer rate, which is the number of pages that can be transferred per second. For example, a page of 3 Mbytes can have a page transfer rate of 0.67 pages per second when the transfer rate is 2 Mbytes per second. Since the page transfer rate is larger than the print rate, which is 0.5 page per second, the page can be printed successfully.

As described earlier, the printer 250 may communicate to the host computer 210 a set of minimum transfer rate requirements, for example 1 Mbytes/sec, 1.5 Mbytes/sec, 2.0 Mbytes/sec and 2.5 Mbytes/sec. For different transfer rate, the criteria for successful printing can be different. For example, when the transfer rate is 1 Mbytes/sec, the maximum size for the compressed raster page is 2 Mbytes, when the transfer rate is 1.5 Mbytes/sec, the maximum size for the compressed raster page is 3 Mbytes. If a compressed raster page has a page size more than the maximum size in field 420 corresponding to the transfer rate of the communication link 245, the page may not be able to print successfully.

In addition, a compression ratio criterion can be used to evaluate the printable raster page. For pages of different resolution, the compression ratio criterion can be different. Pages having larger resolution may need larger compression ratio to shrink data size to ensure successful printing.

If it is determined that the printable raster page can not be printed successfully, for example, the printable raster page has data size larger than the corresponding criterion in field 420, the process proceeds to step S540. In step S540, the host computer 210 can generate the printable raster page with a lower print quality. Afterwards, the process returns to step S530 to determine whether the newly generated printable raster page can be transferred and printed successfully. To lower the print quality, the raster page may be generated with lower resolution or may be compressed by lossy algorithms. In an embodiment, the host computer 210 can first attempt various lossy compression algorithms instead of the lossless compression algorithm to reduce the data size. The various lossy compression algorithms can have different compression ratios and print quality. If the compressed raster page is still larger than the criterion, the host computer 210 may generate the raster page with a lower resolution and compress the raster page with lossless compression algorithm. If the compressed raster page is still large, the host computer 210 can attempt lossy algorithms instead of lossless compression algorithm to further reduce the data size.

If it is determined that the printable raster page can be transferred and printed successfully, then the process proceeds to step S550, where the printable raster page is transferred to the printer for printing. The process then proceeds to step S560, and terminates.

For the ease and clarity of description, the embodiments are presented with examples using USB. However, it is evident that the presented embodiments can be applied to other communication interfaces, such as Ethernet, IEEE 1394, and the like.

For the ease and clarity of description, the embodiments are presented with a bus type architecture. It should be understood that any other architectures can also be used to couple components inside a computer, or a printer.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for printing a page performed by a host computer in communication with a plurality of peripheral devices including a printer, comprising:
    allocating, by the host computer, a transfer rate to the printer having a print rate as a function of the host computer bandwidth allocation to the plurality of peripheral devices;
    generating, by the host computer, a first printable raster page at a first print quality;
    determining, by the host computer, whether the first printable raster page can be transferred to the printer at the transfer rate and satisfy the print rate of the printer;
    generating, by the host computer, a second printable raster page at a second print quality that is lower than the first print quality, when the first printable raster page can not be transferred to the printer at the transfer rate and satisfy the print rate of the printer; and
    transferring, by the host computer, the second printable raster page to the printer.

2. The method according to claim 1, wherein generating the second printable raster page at the second print quality that is lower than the first print quality includes utilizing at least one of a compression algorithm and a lower print resolution to generate the second printable raster page.

3. The method according to claim 1, wherein generating the first printable raster page at the first print quality comprises:
    generating the first printable raster page at a first print resolution.

4. The method according to claim 3, wherein generating the second printable raster page at the second print quality further comprises:
    generating the second printable raster page at a second print resolution that is lower than the first resolution.

5. The method according to claim 1, wherein generating the first printable raster page at the first print quality comprises:
    generating a first raster page at a first print resolution; and
    compressing the first raster page with a first compression algorithm having a first compression to generate the first printable raster page.

6. The method according to claim 5, wherein the first compression algorithm is a lossless compression algorithm.

7. The method according to claim 5, wherein generating the second printable raster page at the second print quality comprises:
    compressing the first raster page with a second compression algorithm having a second compression ratio, the second compression ratio being higher than the first compression ratio.

8. The method according to claim 7, wherein the second compression algorithm is a lossy compression algorithm.

9. The method according to claim 5, wherein generating the second printable raster page at the second print quality further comprises:
    generating a second raster page at a second resolution; and
    compressing the second raster page with the first compression to generate the second printable raster page.

10. The method according to claim 1, wherein determining whether the first printable raster page can be transferred to the printer at the transfer rate and satisfy the print rate of the printer further comprises:
    comparing data size of the first printable raster page with a size criterion associated with the print rate and the transfer rate.

11. The method according to claim 1, wherein determining whether the first printable raster page can be transferred to the printer at the transfer rate and satisfy the print rate of the printer further comprises:
    comparing the print rate and a page transfer rate that is associated with data size of the first printable raster page and the transfer rate.

12. The method according to claim 5, wherein determining whether the first printable raster page can be transferred to the printer at the transfer rate and satisfy the print rate of the printer farther comprises:
    comparing the first compression ratio with a compression ratio criterion that is associated with the print resolution, transfer rate and print rate.

13. An apparatus in connection with a plurality of peripheral devices including a printer, comprising:
    an interface unit that is coupled to the printer, the interface unit having a transfer rate allocated as a function of the apparatus bandwidth allocation to the plurality of peripheral devices; and
    a controller that is coupled to the interface unit, the controller being configured to generate a first printable raster page at a first print quality, determine whether the first printable raster page can be transferred to the printer at the transfer rate and satisfy the print rate of the printer, generate a second printable raster page at a second print quality that is lower than the first print quality when the first printable raster page can not be transferred to the printer at the transfer rate and satisfy the print rate of the printer, and transfer the second printable raster page to the printer via the interface unit.

14. The apparatus according to claim 13, wherein the interface unit is at least one of Universal Serial Bus (USB), Ethernet, and IEEE 1394.

15. The apparatus according to claim 13, wherein the controller is configured to generate the second printable raster page using at least one of a compression algorithm and a lower print resolution.

16. The apparatus according to claim 13, wherein the controller is configured to generate the first printable raster page at a first print resolution.

17. The apparatus according to claim 16, wherein the controller is configured to generate the second printable raster page at the second print resolution that is lower than the first print resolution.

18. The apparatus according to claim 13, wherein the controller is configured to generate a first raster page with a first resolution, and compress the first raster page with a first compression algorithm having a first compression ratio to generate the first printable raster page.

19. The apparatus according to claim 18, wherein the first compression algorithm is a lossless compression algorithm.

20. The apparatus according to claim 18, wherein the controller is configured to compress the first raster page with a second compression algorithm to generate the second printable raster page, wherein a second compression ratio associated with the second compression algorithm is higher than the first compression ratio.

21. The apparatus according to claim 20, wherein the second compression algorithm is a lossy compression algorithm.

22. The apparatus according to claim 18, wherein the controller is further configured to generate a second raster page at a second resolution that is lower than the first resolution, and compress the second raster page with the first compression algorithm to generate the second printable raster page.

23. The apparatus according to claim 13, further comprising:
a memory unit that is configured to store a look up table of criteria, the controller being configured to determine whether the first printable raster page can be transferred to the printer at the transfer rate and satisfy the print rate of the printer according to a criterion from the look up table.

24. The apparatus according to claim 23, wherein the criterion is at least one of data size, compression ratio, and page transfer rate.

25. A printing system for printing a page, comprising:
a printer that is configured to print at a print rate; and
a computer in communication with a plurality of peripheral devices including the printer, the computer including:
an interface unit coupled to the printer, the interface unit having a transfer rate allocated as a function of the computer bandwidth allocation to the plurality of peripheral devices; and
a controller coupled to the interface unit, the controller being configured to generate a first printable raster page at a first print quality, determine whether the first printable raster page can be transferred to the printer at the transfer rate and satisfy the print rate of the printer, generate a second printable raster page at a second print quality that is lower than the first print when the first printable raster page can not be transferred to the printer at the transfer rate and satisfy the print rate of the printer, and transfer the second printable raster page to the printer via the interface unit.

* * * * *